Patented May 6, 1952

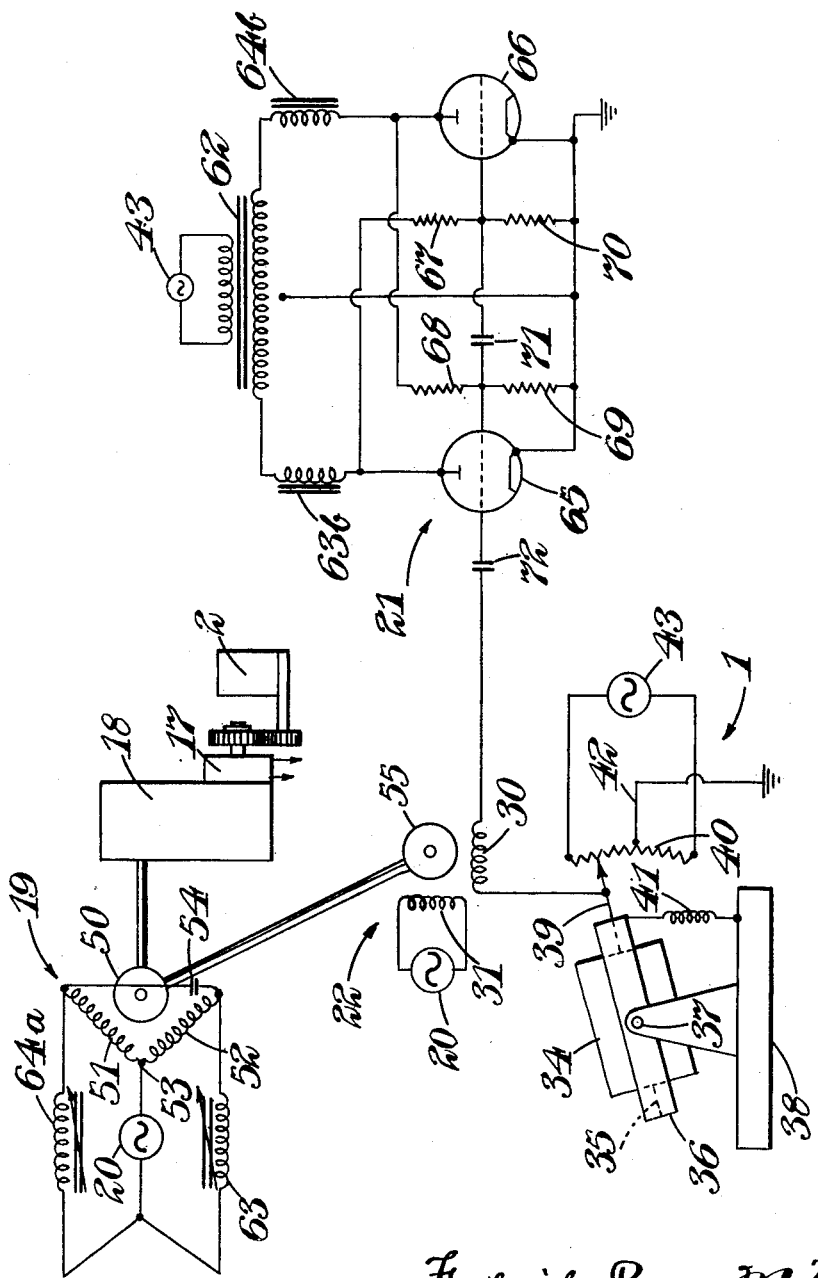

2,595,868

UNITED STATES PATENT OFFICE 2,595,868

AUTOMATIC CONTROL SYSTEM

Frederick Roger Milsom, Boreham Wood, England, assignor to S. Smith & Sons (England) Limited, London, England, a British company, and Furzehill Laboratories Limited, Boreham Wood, England, a British company Application May 5, 1948, Serial No. 25,183
In Great Britain May 5, 1947

11 Claims. (Cl. 318—489)

This invention relates to improvements in amplifiers and in particular to amplifiers for use in automatic control systems for maintaining a condition at a datum value.

Automatic control systems in which a condition is to be maintained constant and in which a motor controlling the condition is made to exert a torque proportional to an electric signal the magnitude of which is proportional to the measured rate of change of the condition are known. Such a control system is described in connection with the automatic control of aircraft in specifications of U. S. applications Nos. 655,684 and 658,614.

In such a system, if out of trim conditions exist so that there is a continual tendency for the condition to vary from the datum, in order to maintain the condition constant a torque must be continuously applied by the motor. Thus if one of the motors of an aircraft fails or if the distribution of the loading of the craft is unequal, the aircraft will tend to move off its preset course and a torque must be continually applied to the rudder to maintain it on course. However, in order that the motor controlling the condition may exert a torque it is necessary that an input signal exists. Thus when such out of trim conditions exist, the condition will drift gradually from the datum condition.

The drift may be reduced by increasing the gain of an amplifier in the control system so that a smaller input signal is required to be applied to the motor control system. If the gain is increased appreciably, however, there is the danger that instability will occur, i. e. "hunting."

It is therefore an object of this invention to provide a high gain amplifier having means for removing the danger of subsequent "hunting."

An amplifier, according to the present invention, comprises a positive feed-back path from the output to the input and means in said path for delaying the action of said feed back. The delay is preferably such that if a signal of short duration is applied to the input, the gain of the amplifier is substantially unaffected by the provision of the feed-back path whereas if a signal of long duration is applied, the gain of the amplifier is increased by said provision.

The invention also includes an automatic control system for maintaining a condition at a datum value in which a signal in accordance with the deviation of the condition is applied to the input of such an amplifier and in which the output of the amplifier controls the condition to restore it to the datum value. The condition controlled may be the position of an aircraft about one of the axes thereof, in which case the signal is preferably in accordance with the rate of turn of the aircraft about the axis and the output controls a servomotor actuating the appropriate control surface of the craft.

The invention will be more clearly understood from the following description reference being made to the accompanying drawing which illustrates by way of example an automatic control system for controlling an aircraft about the yaw axis.

In the specification of application No. 658,614, there was described an automatic control system for aircraft. The accompanying drawing illustrates the yaw control circuit for level flight modified according to the present invention.

In the drawing 1 is a rate of turn gyroscope mounted on the aircraft to detect rates of turn in yaw. The gyroscope comprises a rotor 34 mounted on spin axis 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the midpoint 42 of the resistance 40. The resistance 40 is connected across the A. C. source 43. Midpoint 42 is earthed and the output of the gyroscope appears between contact 39 and earth.

In operation any turn about an axis normal to the base 38 results in precession of the gyroscope about the axis 37 against the spring restraint to an extent determined by the rate of turn. Hence the output voltage will be proportional to the rate of turn and will be in phase or antiphase with source 43 as the turn is in one sense or the other. Contact 39 is connected through the output winding 30 of generator 22 and coupling condenser 72 to the input of valve amplifier 21. Generator 22 is a hysteresis generator of the kind described in British patent specification No. 576,351 and is wound for two phase operation, one phase 31 being connected to a source of the A. C. voltage 29 so that an output proportional to the speed of the generator is generated in the other phase 30. Source 29 is of the same frequency as source 43 but in quadrature therewith.

Motor 19 is a hysteresis motor of the kind described in British patent specifications Nos. 576,248 and 576,249. It comprises a rotor 50 and two windings 51, 52 connected together at point 53. The other ends of windings 51, 52 are connected across a phase-splitting condenser 54. The ends of winding 51, 52 connected to condenser 54 are also connected through the transductor windings 63a, 64a to one terminal of source 20, the other terminal being connected to point 53. Rotor 50 is coupled to rotor 55 of generator 22 and to rudder 2 through gearbox 18 and clutch 17.

Turning now to the amplifier 21, this comprises two triodes 65, 66. Sinusoidal voltages are applied to the anodes by means of the transformer 62 the primary of which is supplied from the source 43. The input signal, in phase or in antiphase with the voltages applied to the anodes, is applied through condenser 72 to the grid of valve 65 and hence through condenser 71 to the grid of valve 66. In the anode circuits of the valves are the control windings 63B, 64B of transductors 63A, 64A in the control circuit of servomotor 19.

The anode of valve 65 is connected through resistor 67 to the grid of valve 66. Similarly resistor 68 is connected to the anode of valve 66 and the grid of valve 65. 69, 70 are grid-leak resistors. Automatic grid-bias for the valves are provided by conventional means (not shown).

The aircraft is maintained on level flight as follows:

As soon as the aircraft deviates from straight flight an A. C. signal will be generated by gyroscope 1 and applied to the input of amplifier 21. This signal will be either in phase or antiphase with the anode voltage of valve 65; assume that it is in phase. Now, when no signal is applied to the input, equal pulses of current pass alternatively through the valves 65, 66, each valve being non-conducting in succeeding half cycles of the voltage from source 43. When the inphase signal is applied, the mean current through valve 65 is increased while that through valve 66 is decreased, thus causing transductor 63 to become more saturated and transductor 64 less saturated.

With no signal applied to the input of amplifier 21, the mean currents through windings 51, 52 of motor 19 are equal since transductors 63, 64 are equally saturated; however when a signal is applied, the transductors became unequally saturated and the mean current through motor winding 52 is less than that through winding 51. Hence during such time as gyroscope 1 emits no signal, motor 19 is not actuated, but when a rate of turn signal is generated, the motor is actuated in a direction in accordance with the phase of the signal.

As was stated above, generator 22 is coupled to motor 19 and hence a voltage proportional to the speed of the motor is applied to the input of amplifier 21 together with the rate of turn signal. The motor 19 operates to reduce the input of the amplifier and since the gain of the amplifier is made large it will reduce this input substantially to nothing. That is to say during a disturbance the motor will run at such a speed that the output of the generator 22 is substantially equal but opposite to the output of the rate of turn device 1 and therefore the rudder 2 will be operated at a speed proportional to the rate of yaw. This will have the effect of very rapidly stabilising any disturbance in yaw.

With the system described, if out of trim conditions exist in the aircraft so that there is a continual tendency for the aircraft to vary from straight flight, in order to maintain the craft flying on a straight course, a constant torque must be applied by motor 19 to the rudder 2. Such out of trim conditions may be brought about by the failing of one of the motors of the aircraft or by unequal loading of the aircraft. In order that such a torque may be continually applied, an input signal to amplifier 21 and hence a rate of turn of the craft must exist. When out of trim conditions exist therefore the craft will normally drift gradually from the course.

Now, when a signal, which may be assumed for the purposes of explanation to be in phase with the voltage on the anode of valve 65, is applied to the grid of that valve, the mean current passed by valve 65 is greater than that passed by valve 66 so that the mean voltage of the anode of valve 65 becomes less than the mean voltage of the anode of valve 66. Condenser 71 is charged up with the plate connected to the grid of valve 65 positive and such charging continues while there is a difference in the mean currents through the valves or until such time as the rate of discharge through the resistances 69, 70 equals the charging through resistances 67, 68.

Now assuming there to exist an out of trim condition of the craft, a certain torque is required of the motor. This will be supplied by the signal to be applied to the grid of valve 65. Owing however to the charging of condenser 71, the potential of the grid of 65 will rise and that of the grid of valve 66 will fall so that a smaller signal is required in order to obtain the same torque. Eventually, a very much smaller input signal is required than would be the case without the feed-back.

The capacity of condenser 71 is made such that a considerable time is required for the charge to build up. Thus if there is no out of trim condition the feed back will substantially have no effect on the system since any random deviation from the preset condition of the craft will be obviated by the control system before the condenser 71 charges sufficiently to have any appreciable effect. On the other hand if a long-term out of trim condition exists, the positive feed-back will come into operation increasing the gain of the circuit, diminishing the input signal required to provide the torque and so decreasing the drift of the craft. If steady out of trim conditions suddenly occur, by, for example, the sudden failure of an engine, the delay before the increased gain becomes effective will prevent the hunt which would occur if the circuit had the high gain at all times and a suddenly increasing signal were applied. The connection applied by the servo-system is thus applied sufficiently slowly to prevent hunting but is sufficiently large to prevent a considerable deviation of the craft.

I claim:

1. An automatic pilot control system for maintaining a control surface at a datum value comprising a device generating an electric signal in accordance with the rate of change of the position of the control surface, means for applying said signal to the input of an amplifier having two grid-controlled valves, means for varying relatively the currents through said valves in accordance with said signal, a feed-back path from the output to the input of the amplifier, a delay condenser in said path charged in accordance with the difference in said currents and applying to the control-grids of said valves a differential bias increasing the difference in the currents therethrough, and means for controlling the position of the control surface in accordance with the difference of the valve currents to restore the position of the control surface to the datum value the delay characteristics of said condenser being such that with normal transient movement of the control surface said delay condenser charges too slowly to appreciably affect said amplifier and that long-term out of trim position of the control surface causes positive feed back in said feed back path increasing the gain of the amplifier and diminishing the required value of input signal whereby hunting is eliminated and deviation minimized.

2. An automatic pilot control system for aircraft comprising a device responsive to rate of turn about one of the axes of the aircraft and generating an electric signal in accordance with the rate of turn, means for applying said signal to the input of an amplifier having two grid-controlled valves, means for varying relatively the currents through said valves in accordance with said signal, a long-time constant positive feed-back path from the output to the input of the amplifier, a condenser in said path charged in accordance with the difference in said currents and applying to the control-grids of said valves a differential bias increasing the difference in the currents therethrough the time-constant of said feed-back path being long compared with the normal period of input signals to the amplifier thus to leave substantially unaffected the gain of said amplifier for normal input signals and to increase the gain of said amplifier for persistent input signals, and means for controlling the aircraft about said axis in accordance with the difference of the valve currents to maintain the craft in a datum position about said axis.

3. An automatic pilot control system for aircraft comprising a device responsive to rate of turn about one of the axes of the aircraft and generating an electric A. C. signal in accordance with the rate of turn, an amplifier having two grid-controlled valves, means for applying the A. C. signal to the grids in push-push, means for applying to the anodes A. C. voltages mutually in antiphase and of the same frequency as the signal, said anode voltages being inphase and antiphase with the signal, a condenser connected between the grids, resistance connections between the grid of each valve and the anode of the other valve to form with said condenser a long time constant positive feed-back path, whereby if the period of signal is short compared with the time constant of said feed-back path, the gain of the amplifier remains substantially unaltered whereas if the period of the signal is long compared with said time-constant the condenser is charged to apply to the grids a differential bias which increases the difference in the mean currents passing through the valves, an electric A. C. servomotor controlled in accordance with the difference in the currents flowing through the two valves and actuating the appropriate control surface of the aircraft to maintain the aircraft in a predetermined position about the axis.

4. An automatic control system for aircraft as claimed in claim 3 in which the aircraft is controlled about the yaw axis and in which the said device is a rate of turn gyroscope detecting turn about the yaw axis and controlling through said amplifier the rudder to maintain the aircraft on straight flight.

5. An automatic control system to maintain a craft on a datum course in conditions requiring application of a substantially constant non-zero torque to a control surface of said craft to maintain said course comprising a device generating an electric signal in accordance with departure of said craft from said course, means for applying said signal to the input of an amplifier, delayed feed back means connected between output and input of said amplifier to increase gain of said amplifier for persistent input signals as compared with that for transient input signals, a servomotor generating a torque in accordance with output of said amplifier, said servomotor controlling said control surface to maintain the craft substantially on its datum course.

6. An automatic control system to maintain a craft on a datum course in conditions requiring application of a substantially constant non-zero torque to a control surface of said craft to maintain said course comprising a device generating an electric signal in accordance with variation of a condition determining said course from a datum value, means for applying said signal to the input of an amplifier, feed back means connected between output and input of said amplifier, said feed back means comprising a condenser charged in accordance with the output of said amplifier, the gain of said amplifier varying in accordance with the charge of said condenser, being greater for signals having a duration comparable with or longer than time of charge of said condenser than for signals having a duration small compared with time of charge of said condenser, and a servomotor controlling said control surface generating a torque in accordance with output of said amplifier to maintain the craft on its datum course the delay characteristics of said condenser being such that with normal transient movement of said control surface said condenser charges too slowly to appreciably affect said amplifier and such that long-term out of trim correction position of said control surface causes positive feed back increasing the gain of the amplifier and diminishing the required value of input signal whereby hunting is eliminated and deviation is minimized.

7. An automatic control system to maintain a craft on a datum course in conditions requiring an application of a substantially constant non-zero torque to a control surface of said craft to maintain the said course comprising a device generating an electric signal in accordance with rate of turn of said craft, means for applying said signal to the input of an amplifier, said amplifier generating two currents whose difference is in accordance with said input signal, a condenser charged in accordance with the difference between said currents and connected to the input of said amplifier to increase the difference between said currents in accordance with voltage across said condenser and so to increase difference between the aforesaid two currents for an input signal whose duration is long compared with the charging time of said condenser as compared with the difference for an input signal whose duration is short compared with said charging time, and a servomotor controlled in accordance with difference of said currents controlling the control surface to maintain craft on said course the delay characteristics of said condenser being such that with normal transient movement of said control surface said condenser charges too slowly to appreciably affect said amplifier and such that long-term out of trim correction position of said control surface causes positive feed back increasing the gain of the amplifier and diminishing the required value of input signal whereby hunting is eliminated and deviation is minimized.

8. An automatic control system for an aircraft comprising a device responsive to rate of turn of the aircraft about one of its axes and generating a signal in accordance with said rate of turn, a servomotor actuating a control surface to control the aircraft about the said axis, said servomotor being adapted to be controlled by two differentially variable electric currents, an electric tachometric signal generator giving a signal in accordance with rate of movement of said control surface, and an electric amplifier to the input of which are applied in opposition the signals from the rate of turn device and the tachometric generator and whose output consists of the difference between the anode currents in two grid-controlled thermionic valves, the said output being utilised to control the servomotor, said amplifier having a long time constant positive feed-back path from the anode of each of the aforesaid thermionic valves to the grid of the other to increase the gain of the amplifier for persistent input signals.

9. An automatic control system as claimed in claim 5, in which the long time constant positive feed-back path comprises for each valve a resistor connected from its anode to the grid of the other valve, further resistors connected between each grid and the corresponding cathode and a condenser connected between the grids, said condenser thus being changed in accordance with the difference between the currents through the valves to increase the gain for persistent input signals.

10. An automatic control system for an aircraft comprising a device generating an electric A. C. signal in accordance with the rate of turn of the aircraft about one of its axes, an electric servomotor acutating a control surface to control the aircraft about said axis, said servomotor being adapted to be controlled by two differentially variable electric currents, an electric tachometric signal generator giving an A. C. signal in accordance with rate of movement of said control surface, and an electric amplifier to the input of which are applied in opposition the signals from the rate of turn device and the tachometric generator, to form a resultant input signal, the said amplifier comprising two grid controlled thermionic valves the difference between the anode currents in which constitutes the amplifier output, the said output being utilized to control the servomotor, the resultant input signal being applied to the grids of each of thermionic valves in one phase and equal A. C. voltages of the same frequency as the resultant input signal being applied to each anode, the voltage on the anode of one valve being in the same phase as that on its grid and that on the anode of the other valve being in antiphase with that on its grid, for each valve a resistor connected from its anode to the grid of the other valve, further resistors connected between each grid and the corresponding cathode, and a condenser between the grids, said condenser being charged in accordance with the difference between the grids and said condenser and resistors forming a long-time constant positive feed-back path to increase the gain of the amplifier for persistent resultant input signals, the delay characteristics of said condenser being such that with normal transient movement of said control surface said condenser charges too slowly to appreciably affect said amplifier and such that long-term out of trim position of said control surface causes positive feed back increasing the gain of the amplifier and diminishing the required value of input signal whereby hunting is eliminated and deviation is minimized.

11. An automatic control system as claimed in claim 7 in which the electric servomotor is a 3-phase wound A. C. machine with one terminal connected to one side of an A. C supply the other terminals joined by a phase-splitting condenser and each connected through the power winding of a saturatable reactor to the other side of the A. C. supply the control windings of the saturable reactors being respectively fed with the currents constituting the output of the amplifier.

FREDERICK ROGER MILSOM.

REFERENCES CITED

The following references are of record in the file of this patent:

UNITED STATES PATENTS

| Number | Name | Date |
|---|---|---|
| 1,958,258 | Alexanderson | May 8, 1934 |
| 1,966,170 | Greene | July 10, 1934 |
| 2,115,086 | Riggs | Apr. 26, 1938 |
| 2,217,254 | Langgasser | Oct. 8, 1940 |
| 2,333,393 | Ryder | Nov. 2, 1943 |
| 2,423,228 | Conklin | July 1, 1947 |